(12) United States Patent
Kobayashi

(10) Patent No.: US 6,882,648 B2
(45) Date of Patent: Apr. 19, 2005

(54) COMMUNICATION DEVICE

(75) Inventor: Nobumasu Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 790 days.

(21) Appl. No.: 09/774,131

(22) Filed: Jan. 30, 2001

(65) Prior Publication Data
US 2001/0026550 A1 Oct. 4, 2001

(30) Foreign Application Priority Data
Mar. 29, 2000 (JP) .................................... 2000-090001

(51) Int. Cl.$^7$ ............................................. H04L 12/56
(52) U.S. Cl. ..................... 370/395.1; 370/385; 370/399
(58) Field of Search ............................ 370/389, 395.1, 370/397, 399, 385

(56) References Cited

U.S. PATENT DOCUMENTS

| 5,368,364 A | * | 11/1994 | Kanai ................... 297/411.27 |
| 5,668,812 A | * | 9/1997 | Akiyoshi ................... 370/474 |
| 6,137,798 A | * | 10/2000 | Nishihara et al. ........... 370/392 |
| 6,598,080 B1 | * | 7/2003 | Nagami et al. ............. 709/227 |

* cited by examiner

Primary Examiner—Kenneth Vanderpuye
(74) Attorney, Agent, or Firm—Greer, Burns & Crain, Ltd

(57) ABSTRACT

A communication device wherein path selection is performed taking account of the conditions of individual paths on a network. Storing means stores information relating to a plurality of paths, and selecting means selects the information relating to one of the paths stored in the storing means. Packet generating means generates a packet with a header matching the information relating to the path selected by the selecting means, and transmitting means transmits the packet generated by the packet generating means.

7 Claims, 13 Drawing Sheets

| NEIGHBORING DEVICE ADDRESS OF REMOTE SIDE | NEIGHBORING DEVICE ADDRESS OF LOCAL SIDE | STATUS | ONGOING CONNECTION COUNT |
|---|---|---|---|
| IPc | IPa | AVAILABLE | 3 |
| IPc | IPb | UNAVAILABLE | 0 |
| IPd | IPa | AVAILABLE | 2 |
| IPd | IPb | AVAILABLE | 5 |

FIG. 4

COMMUNICATION DEVICE

BACKGROUND OF THE INVENTION

(1) Field of the Invention

The present invention relates to a communication device, and more particularly, to a communication device for communicating with a remote device by using one of a plurality of paths.

(2) Description of the Related Art

In TCP/IP (Transmission Control Protocol/Internet Protocol) communications, for example, basically an IP packet reaches a destination communication device via a plurality of routers, and one path is usually selected from a plurality of paths to carry out communication.

As a method of selecting one path from among multiple paths, a protocol called RIP (Routing Information Protocol) has been in use, for example. In RIP, each router stores the addresses of neighboring devices and hop counts, and sends out a received IP packet to a path with the smallest hop count, thereby selecting an optimum path.

According to RIP, however, a path is selected by looking up only the hop counts, and accordingly, it is not possible to make path selection reflecting congestion conditions.

Also, in cases where a certain device on a network has developed a fault, it is necessary that routing should be changed. Conventionally, however, information indicative of such fault is propagated by means of communications between individual devices, and a problem therefore arises in that considerable time is required before the routing information converges.

SUMMARY OF THE INVENTION

The present invention was created in view of the above circumstances, and an object thereof is to provide a communication device which is capable of path selection reflecting path congestion conditions and which also enables routing information to converge promptly in cases where fault has occurred in part of devices constituting a network.

To achieve the above object, the present invention provides a communication device for communicating with a remote device by using one of a plurality of paths. The communication device comprises storing means for storing information relating to the paths, selecting means for selecting the information relating to one of the paths stored in the storing means, packet generating means for generating a packet with a header matching the information relating to the path selected by the selecting means, and transmitting means for transmitting the packet generated by the packet generating means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a chart showing an example of routing information stored in a routing information management section appearing in FIG. 3;

DESCRIPTION OF THE PREFERRED EMBODIMENTS

An embodiment of the present invention will be hereinafter described with reference to the drawings.

Figure 1:
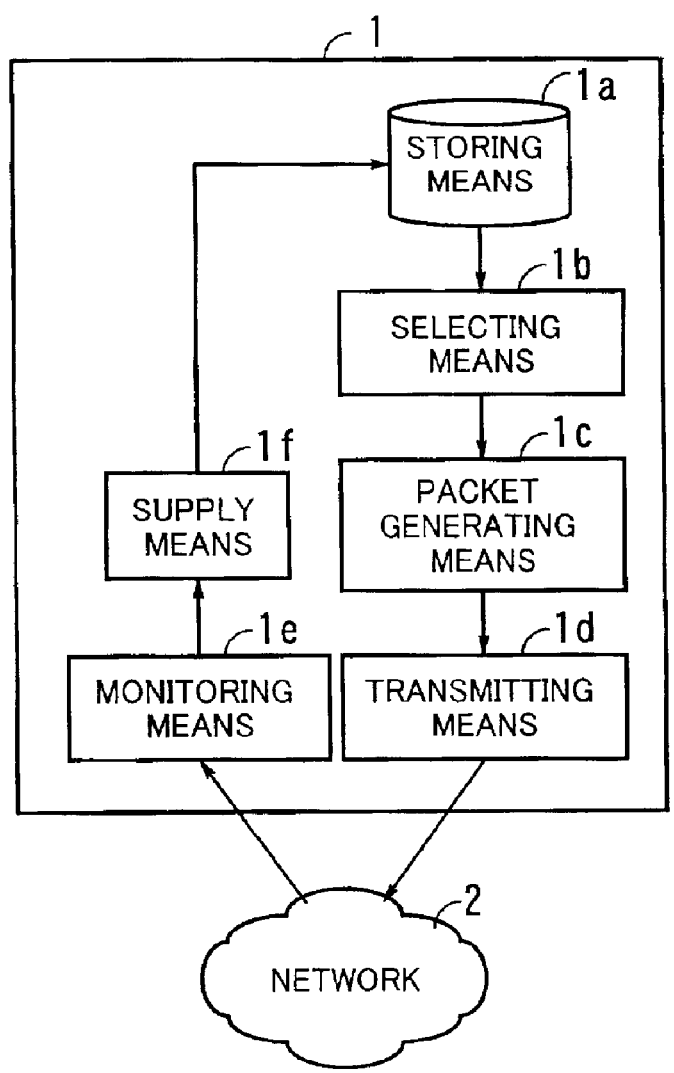
FIG. 1 is a diagram illustrating the principle of operation according to the present invention.

FIG. 1 illustrates the principle of operation according to the present invention. As shown in the figure, a communication device 1 according to the present invention comprises storing means 1a, selecting means 1b, packet generating means 1c, transmitting means 1d, monitoring means 1e and supply means 1f, and is connected to a network 2.

The storing means 1a stores information (hereinafter referred to as routing information) indicating a plurality of selectable paths through which the communication device 1 can communicate with other communication devices, not shown, over the network 2.

The selecting means 1b selects specified routing information from among a plurality of sets of routing information stored in the storing means 1a.

The packet generating means 1c generates a packet with a header matching the routing information selected by the selecting means 1b.

The transmitting means 1d sends out the packet generated by the packet generating means 1c to the network 2.

The monitoring means 1e monitors the status of a plurality of paths that exist on the network 2.

The supply means 1f supplies the status of paths obtained by the monitoring means 1e to the storing means 1a to be stored therein.

Operation according to the principle illustrated in the figure will be now described.

The monitoring means 1e monitors availability conditions and congestion conditions of the network 2, and notifies the supply means 1f of the results of monitoring.

The supply means 1f supplies the storing means 1a with the results of monitoring by the monitoring means 1e, whereupon the monitoring results are stored in the storing means in association with corresponding routing information.

The storing means 1a stores routing information about selectable paths to specified remote communication devices, availability conditions and congestion conditions of the paths in a manner associated with one another. For example, the storing means stores Ra, Rb, Rc and Rd as paths selectable when communicating with a remote communication device S, as well as information indicating that Ra is currently unavailable and that Rb and Rc are congested.

When a remote communication device has been specified, the selecting means 1b selects an optimum path by looking up the information stored in the storing means 1a. In the above example, Rd, which is available and is not congested, is selected.

The packet generating means 1c generates a packet with a header matching the routing information selected by the selecting means 1b. In this example, a packet having a header affixed with information corresponding to the path Rd is generated.

The transmitting means 1d sends out the packet generated by the packet generating means 1c to the network 2.

Consequently, the packet sent out from the transmitting means 1d is delivered to the remote communication device via the optimum path that reflects the availability and congestion conditions of that moment.

As described above, the communication device 1 according to the present invention selects an optimum path in accordance with the availability and congestion conditions of paths to transmit and receive packets to and from a remote communication device, so that communications can be performed via an optimum path taking account of ever-changing conditions of the network.

Figure 2:
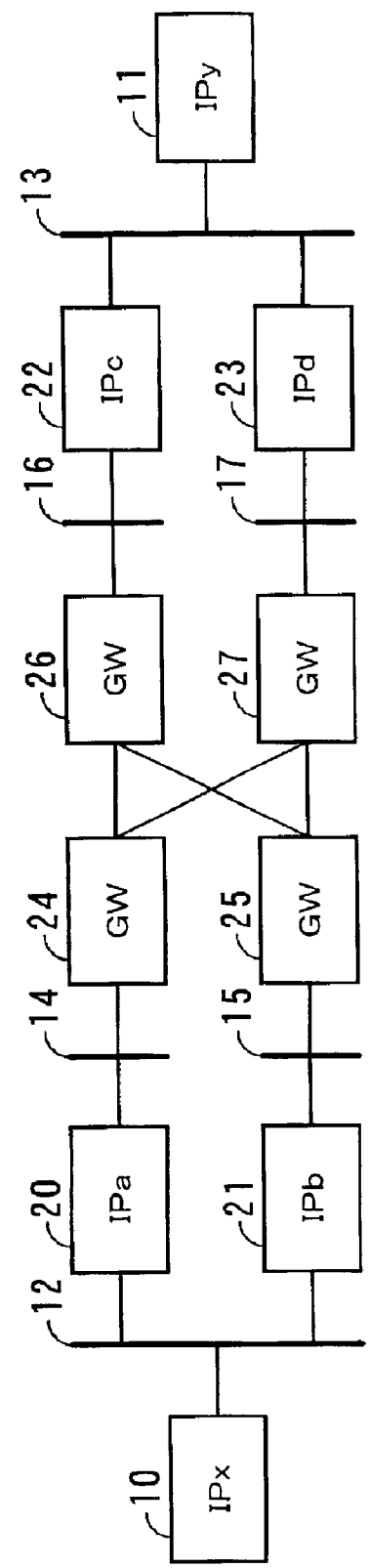
FIG. 2 illustrates an entire system configuration including a communication device according to the present invention.

Referring now to FIG. 2, an embodiment of the present invention will be described.

FIG. 2 illustrates an entire system configuration including a communication device 10 according to the present invention.

In the figure, communication devices 10 and 11, each embodying the present invention, have IP addresses IPx and IPy, respectively, and exchange information with other communication devices through LANs (Local Area Networks) 12 and 13, respectively. The configuration of the communication device 10 will be described in detail later with reference to FIG. 3.

LANs 12 through 17, which are in-house information communication networks, each interconnect computers installed in a limited area, such as in an office or building, to permit exchange of information with one another.

Connection devices 20 to 23, which have IP addresses IPa to IPd, respectively, interconnect networks and send out received packets through optimum paths.

Gateways (GW) 24 to 27 also interconnect networks and convert message format, address and protocol to those matching the network to be connected to, to permit exchange of information.

Figure 3:
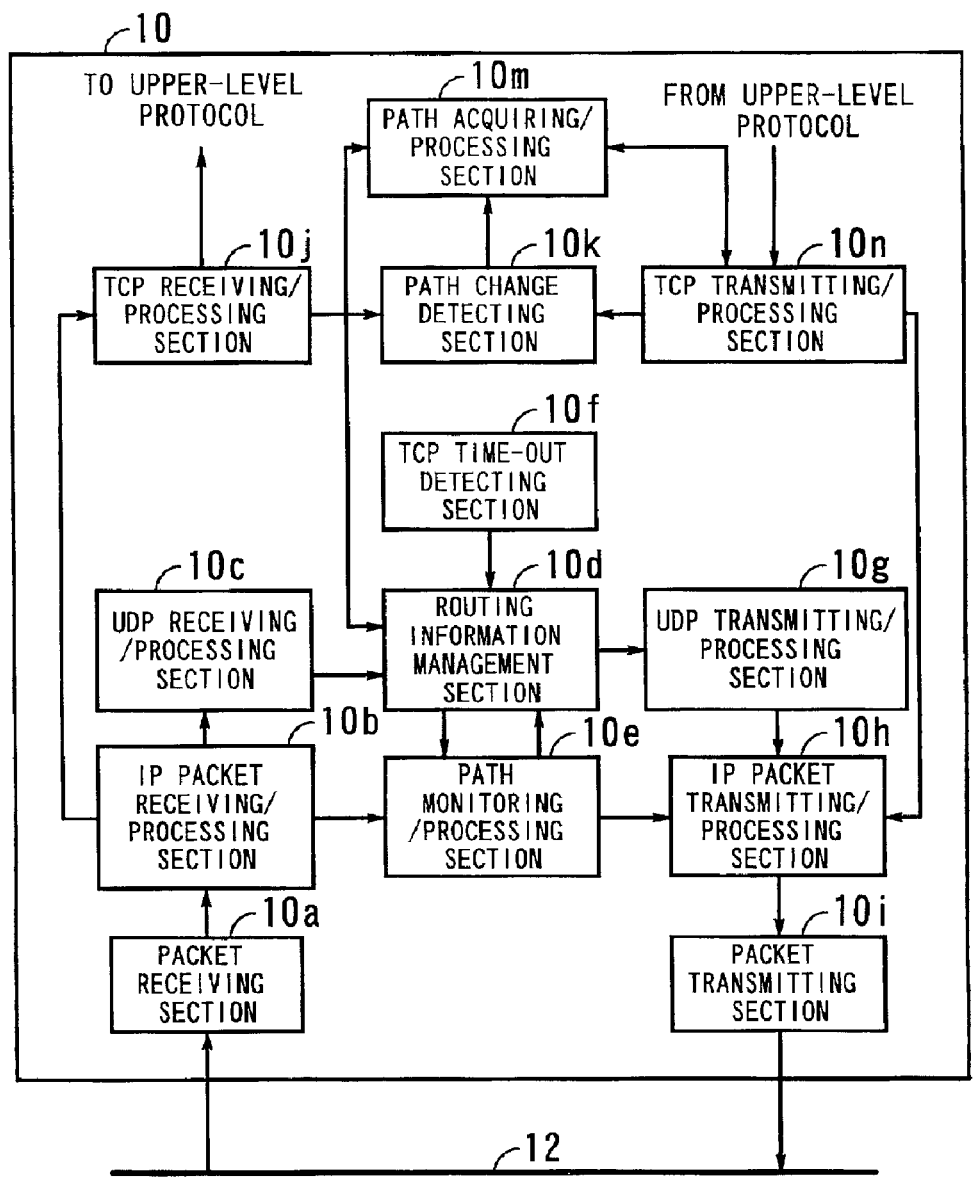
FIG. 3 illustrates the configuration of a communication device according to one embodiment of the present invention.

Referring now to FIG. 3, the configuration of the communication device 10 appearing in FIG. 2 will be described in detail.

As shown in the figure, the communication device 10 according to the present invention comprises a packet receiving section 10a, an IP packet receiving/processing section 10b, a UDP (User Datagram Protocol) receiving/processing section 10c, a routing information management section 10d, a path monitoring/processing section 10e, a TCP time-out detecting section 10f, a UDP transmitting/processing section 10g, an IP packet transmitting/processing section 10h, a packet transmitting section 10i, a TCP receiving/processing section 10j, a path change detecting section 10k, a path acquiring/processing section 10m, and a TCP transmitting/processing section 10n.

The packet receiving section 10a receives a packet destined therefor from the LAN 12.

The IP packet receiving/processing section 10b supplies the packet received by the packet receiving section 10a selectively to one of the TCP receiving/processing section 10j, the UDP receiving/processing section 10c and the path monitoring/processing section 10e in accordance with the protocol of the received packet.

The UDP receiving/processing section 10c receives an independent UDP packet (datagram) according to UDP which is a protocol allowing direct handling by an application. Specifically, the UDP receiving/processing section 10c receives path-related information transmitted from a remote communication device, and supplies the received information to the routing information management section 10d.

The routing information management section 10d manages all existing paths to specified remote communication devices, availability conditions of the respective paths, and ongoing connection counts of the respective paths in a manner associated with one another.

FIG. 4 shows an example of routing information which the communication device 10 holds as indicative of paths to the communication device 11. In the figure, "NEIGHBORING DEVICE ADDRESS OF REMOTE SIDE" indicates the IP address of a device neighboring the communication device 11, and "NEIGHBORING DEVICE ADDRESS OF LOCAL SIDE" indicates the IP address of a device neighboring the communication device 10. "STATUS" indicates whether each path is currently available or not. "ONGOING CONNECTION COUNT" indicates the number of connections currently allocated to each path. "Connection" is synonymous with "session" and denotes a unit of communication.

In the event that a time-out has occurred during a transmission process (no response is returned from the remote communication device), the path monitoring/processing section 10e transmits and receives an echo packet conforming to ICMP (Internet Control Message Protocol).

The TCP time-out detecting section 10f detects a time-out occurring at the time of transmission, and notifies the routing information management section 10d of the occurrence of time-out.

The UDP transmitting/processing section log transmits information indicative of a change of path status to the remote communication device.

The IP packet transmitting/processing section 10h acquires information from the path monitoring/processing section 10e, the UDP transmitting/processing section 10g or from the TCP transmitting/processing section 10n, and supplies the acquired information to the packet transmitting section 10i.

The packet transmitting section 10i sends out the packet supplied from the IP packet transmitting/processing section 10h to the LAN 12.

The TCP receiving/processing section 10j transfers a packet whose protocol is TCP to an upper-level protocol, and also supplies the routing information affixed to the header of the packet to the path change detecting section 10k.

The path change detecting section 10k compares the routing information (path selected by the remote device)

supplied from the TCP receiving/processing section 10j with the routing information (path selected by the local device) supplied from the TCP transmitting/processing section 10n, and if the two disagree, the path change detecting section notifies the path acquiring/processing section 10m that the remote device has changed paths for some reason.

The path acquiring/processing section 10m performs a process for changing paths.

The TCP transmitting/processing section 10n supplies the IP packet transmitting/processing section 10h with a packet received from the upper-level protocol. It also extracts the routing information affixed to the header of the received packet and supplies the extracted information to the path change detecting section 10k.

Operation of the above embodiment will be now described.

Assuming that a request to transmit a packet to the connection device 20 has been made from the upper-level protocol, the TCP transmitting/processing section 10n sends an inquiry to the path acquiring/processing section 10m, to determine whether or not routing information for routing up to the connection device 20 has already been set. If such routing information has been set, the packet is sent out using the set path; if not, the TCP transmitting/processing section requests the path acquiring/processing section 10m to acquire a path.

When requested to acquire a path, the path acquiring/processing section 10m retrieves routing information relating to the specified remote device from the routing information stored in the routing information management section 10d. From among the routing information thus acquired, a path of which the "STATUS" shown in FIG. 4 is "AVAILABLE" and which has the smallest "ONGOING CONNECTION COUNT" is selected as an optimum path, which is then supplied to the TCP transmitting/processing section 10n At this time, the ongoing connection count of the selected routing information is incremented by "1". In the example shown in FIG. 4, a path of which the status is available and which has the smallest ongoing connection count is the third path; accordingly, the third path is selected and its ongoing connection count is changed to "3",. The path acquiring/processing section 10m stores the acquired paths and their connections in a manner associated with each other, and supplies the already acquired routing information in response to subsequent inquiries.

The TCP transmitting/processing section 10n generates a header matching the routing information supplied thereto and affixes the generated header to the packet, which is then supplied to the IP packet transmitting/processing section 10h. Specifically, the TCP transmitting/processing section 10n stores the routing information supplied thereto from the path acquiring/processing section 10m in a fixed area (area for storing a source address and a destination address) and an IP option area (area for storing information indicative of a path between the source address and the destination address) of the IP packet.

Figure 5:
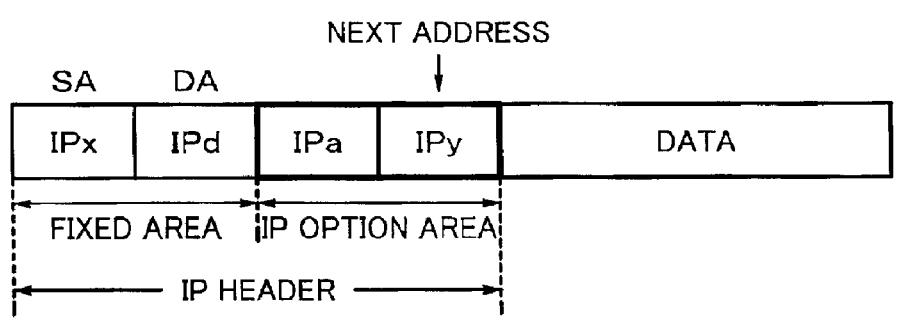
FIG. 5 is a diagram showing an example of a packet sent out from a communication device 10 appearing in FIG. 2.

In this example, the selected path is the path leading to the communication device 11 via the connection device 20, the gateway 24 and the connection device 23, and accordingly, the IP addresses IPx and IPd of the communication devices 10 and 23 are stored as the source and destination addresses, respectively, as shown in FIG. 5. Also, the IP addresses IPa and IPy of the connection device 20 and the communication device 11, respectively, are stored in the IP option area.

The packet affixed with the header is supplied to the IP packet transmitting/processing section 10h. On receiving the IP packet, the IP packet transmitting/processing section 10h sends out the IP packet to the LAN 12 via the packet transmitting section 10i.

Figure 6:
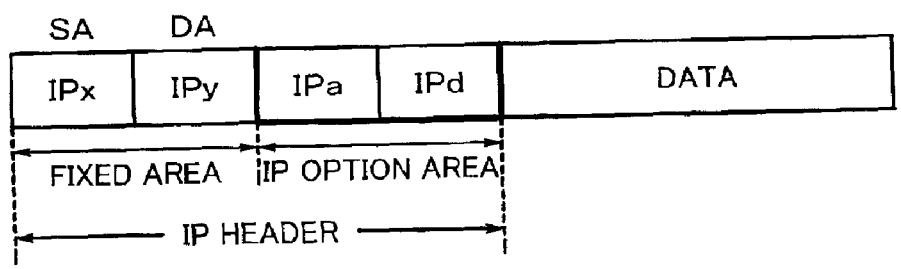
FIG. 6 is a diagram showing an example of a packet sent out from a connection device 23 appearing in FIG. 2.

The packet sent out in this manner is first received by the connection device 20, and then by the connection device 23 after being transferred via the gateways 24 and 27. The header is rewritten in the connection device 23. Specifically, the destination address IPd is replaced by the next address IPy stored in the IP option area. As a result, a packet as shown in FIG. 6 is obtained.

Consequently, the packet transmitted from the communication device 10 is transferred via the connection device 20, the gateways 24 and 27, and the connection device 23, and is received by the communication device 11.

The communication device 11 transmits a packet responsive to the received packet via the same path. As a consequence, the communication device 10 receives the packet, whereupon a communication process is started.

If the communication device 10 receives no responsive packet, then a time-out is detected by the TCP time-out detecting section 10f of the communication device 10.

When a time-out has been detected, the routing information management section 10d notifies the path acquiring/processing section 10m of the occurrence of time-out and requests the same to acquire a new path. Also, the routing information management section decrements the ongoing connection count of the path used until then by "1". Then, the routing information management section 10d causes the path monitoring/processing section 10e to perform an echo process for determining whether the path, with respect to which a time-out has occurred, is really unavailable or not and for detecting restoration of the path.

In the echo process, the IP packet transmitting/processing section 10h sends out an echo packet to the path which has presumably developed a fault, and detects the return of the echo packet to determine whether or not the path is unavailable. Specifically, if the echo packet is not returned within a predetermined time, the path is judged to be abnormal. Accordingly, the "STATUS" of the corresponding routing information stored in the routing information management section 10d is changed to "UNAVAILABLE", and the unavailable status is notified to the remote device by the UDP transmitting/processing section 10g through a different path. On the other hand, if the echo packet is returned within the predetermined time, the path is judged to be normal; accordingly, the "STATUS" of the path is changed to "AVAILABLE" and the available status is notified to the remote device by the UDP transmitting/processing section 10g.

Figure 7:
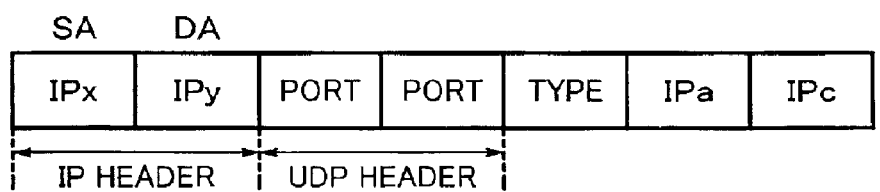
FIG. 7 is a diagram showing an example of a packet which is sent out from the communication device 10 in FIG. 2 and indicates a change of path status.

FIG. 7 shows an exemplary structure of a packet used to notify a remote device of abnormality of a path. In the illustrated example, the source and destination addresses are stored in the IP header, and ports are stored in the UDP header. Also, in the data storage area are stored the IP addresses "IPa" and "Ipc" corresponding to the neighboring device addresses of local and remote sides, shown in FIG. 4. "TYPE" stores information indicating whether the path is normal or abnormal.

In the above example, abnormality of a path is detected by the communication device 10. In cases where abnormality of a path is detected by the communication device 11, it is the communication device 11 that changes paths, and accordingly, a packet transmitted from the communication device 11 follows a different path. In such cases, the path change detecting section 10k detects a difference between the path of the packet sent out from the local device and that of the packet received from the communication device 11.

When such a path difference has been detected by the path change detecting section 10k, the path acquiring/processing section 10m changes its own path so that subsequent packets may follow the same path. As a result, packets transmitted from the communication device 11 and those transmitted from the communication device 10 always follow the same path.

In the case where the remote device has changed paths, a message notifying the path change arrives after a lapse of a predetermined time. Thus, upon receiving the message, the UDP receiving/processing section 10c causes the path monitoring/processing section 10e to transmit an echo packet to determine whether the path is unavailable or not. If the path is found to be unavailable, the corresponding path status stored in the routing information management section 10d is changed to "UNAVAILABLE". In order to detect restoration of the path, the path monitoring/processing section 10e transmits an echo packet at predetermined intervals of time.

As described above, according to the embodiment of the present invention, all existing paths to remote devices are stored as the routing information, and also ongoing connection counts indicative of degrees of congestion are stored in association with the respective paths, whereby path selection can be made taking account of the degrees of congestion of the paths.

Also, in addition to all existing paths to remote devices stored as the routing information, availability conditions are stored in association with the respective paths. Thus, even in cases where fault has occurred in part of the devices constituting the network, it is possible to make the routing information converge quickly.

Referring now to FIGS. 8 through 13, examples of processes executed in the above embodiment will be described.

Figure 8:
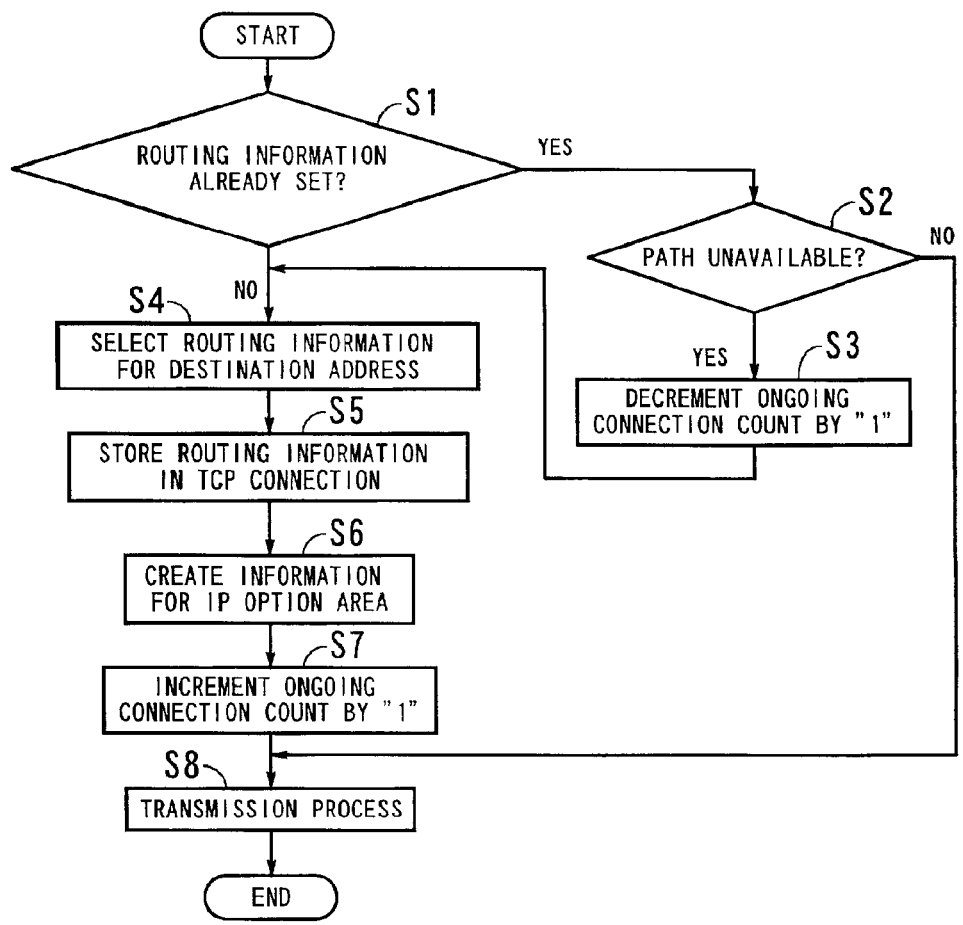
FIG. 8 is a flowchart showing an example of a process executed when a transmission request has been made from an upper-level protocol.

FIG. 8 is a flowchart showing an exemplary process executed when transmission of a packet has been requested from the upper-level protocol. Upon start of the process shown in the flowchart, the following steps are executed.

[S1] The TCP transmitting/processing section 10n sends an inquiry to the path acquiring/processing section 10m, to determine whether or not a connection for the request has already been established. If such a connection has already been established, the flow proceeds to Step S2; if not, the flow proceeds to Step S4.

[S2] The path acquiring/processing section 10m determines whether or not the path in question is unavailable. If the path is unavailable, the flow proceeds to Step S3; if not, the flow proceeds to Step S8.

[S3] The path acquiring/processing section 10m decrements the ongoing connection count of the corresponding path, stored in the routing information management section 10d, by "1".

[S4] The path acquiring/processing section 10m selects routing information corresponding to the destination address from among the information stored in the routing information management section 10d.

[S5] The path acquiring/processing section 10m stores the routing information in TCP connection which serves as a pointer pointing to predetermined information in the routing information management section 10d.

[S6] The path acquiring/processing section 10m creates information for the IP option area, based on the neighboring device addresses of remote and local sides stored in the routing information management section 10d.

[S7] The path acquiring/processing section 10m increments the corresponding ongoing connection count by "1".

[S8] The IP packet transmitting/processing section 10h transmits the packet created by the TCP transmitting/processing section 10n to the remote destination device.

Figure 9:
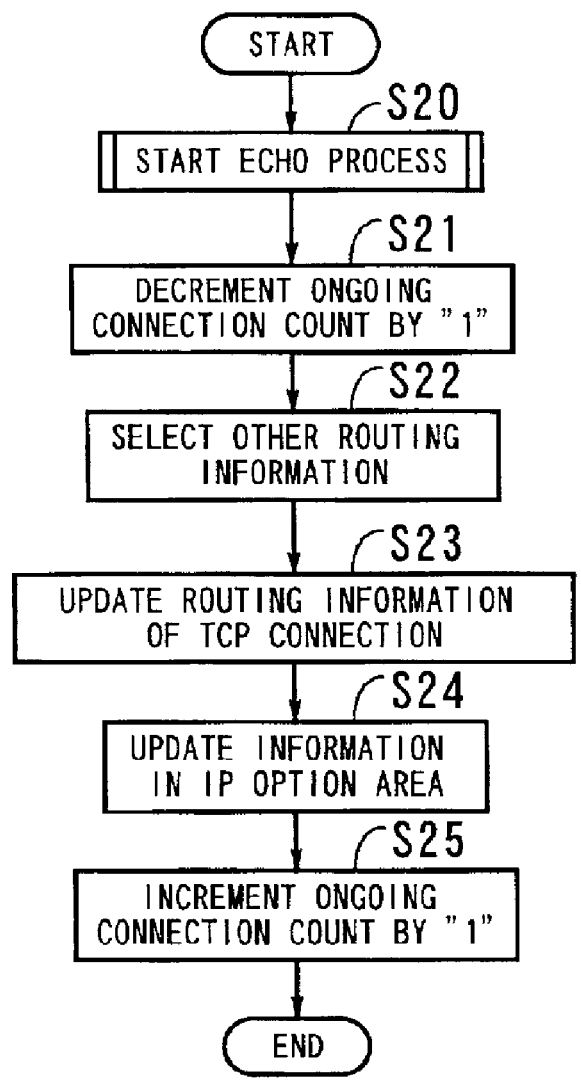
FIG. 9 is a flowchart showing an example of a process executed when a time-out has occurred at the time of packet transmission.

An example of a process executed when a time-out has been detected by the TCP time-out detecting section 10f after the transmission of a packet will be now described with reference to the flowchart of FIG. 9. Upon start of the process, the following steps are executed.

[S20] The path monitoring/processing section 10e starts the echo process.

Details of this process will be described later with reference to FIG. 10.

[S21] The path monitoring/processing section 10e decrements, by "1", the connection count in the routing information associated with the path with respect to which a time-out has occurred.

[S22] The path acquiring/processing section 10m selects other routing information from among the information stored in the routing information management section 10d. Specifically, the path acquiring/processing section 10m selects, as a substitute path, a path which is different from the one with respect to which a time-out has occurred, of which the status is "AVAILABLE" and which has the smallest connection count.

[S23] The path acquiring/processing section 10m updates the routing information of the TCP connection in accordance with the selected substitute path.

[S24] The path acquiring/processing section 10m updates the information in the IP option area in accordance with the selected substitute path.

[S25] The path acquiring/processing section 10m increments the ongoing connection count of the substitute path by "1".

Figure 10:
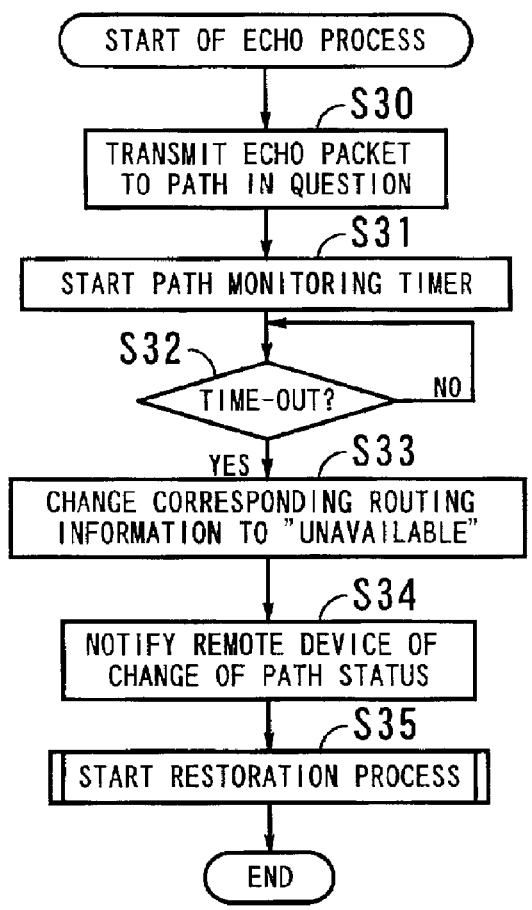
FIG. 10 is a flowchart illustrating details of an echo process appearing in FIG. 9.

Referring now to FIG. 10, the "ECHO PROCESS" appearing in FIG. 9 will be described in detail. Upon start of the process shown in the flowchart, the following steps are executed.

[S30] The path monitoring/processing section 10e causes the IP packet transmitting/processing section 10h to transmit an echo packet to the path in question.

[S31] The path monitoring/processing section 10e starts a path monitoring timer, not shown.

[S32] The path monitoring/processing section 10e determines whether or not a time-out has occurred. If a time-out has occurred, the flow proceeds to Step S33; otherwise the flow returns and Step S32 is repeated.

[S33] The path monitoring/processing section 10e changes the status of the corresponding path, stored in the routing information management section 10d, to "UNAVAILABLE".

[S34] The UDP transmitting/processing section 10g sends a message to the remote device to notify the same that the path status has changed.

[S35] The path monitoring/processing section 10e starts a restoration process. This process will be described in detail with reference to FIG. 11.

Figure 11:
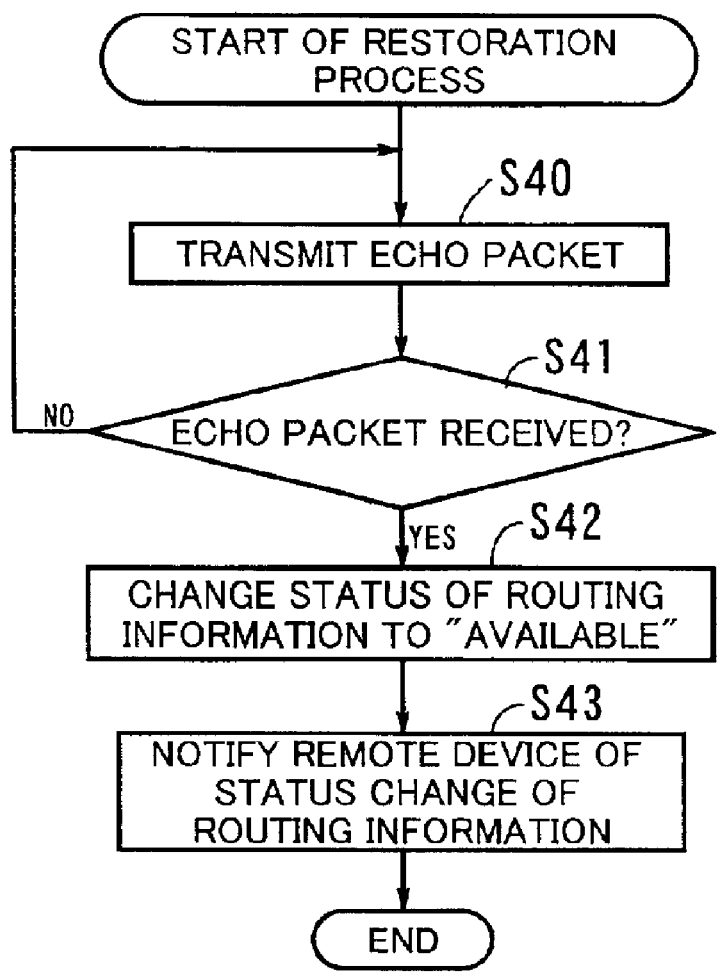
FIG. 11 is a flowchart illustrating details of a restoration process appearing in FIG. 10.

Referring now to FIG. 11, details of the "RESTORATION PROCESS" appearing in FIG. 10 will be described. Upon start of the process shown in the flowchart, the following steps are executed.

[S40] The path monitoring/processing section 10e transmits an echo packet to the remote device in question.

[S41] The path monitoring/processing section 10e determines whether or not the IP packet receiving/processing section 10b has received the echo packet. If the echo packet has been received, the flow proceeds to Step S42; if not, the flow returns to Step S40 and repeats the same process.

[S42] The path monitoring/processing section 10e changes the status of the corresponding path stored in the routing information management section 10d to "AVAILABLE".

[S43] The UDP transmitting/processing section 10g notifies the remote device that the path has become available.

Figure 12:
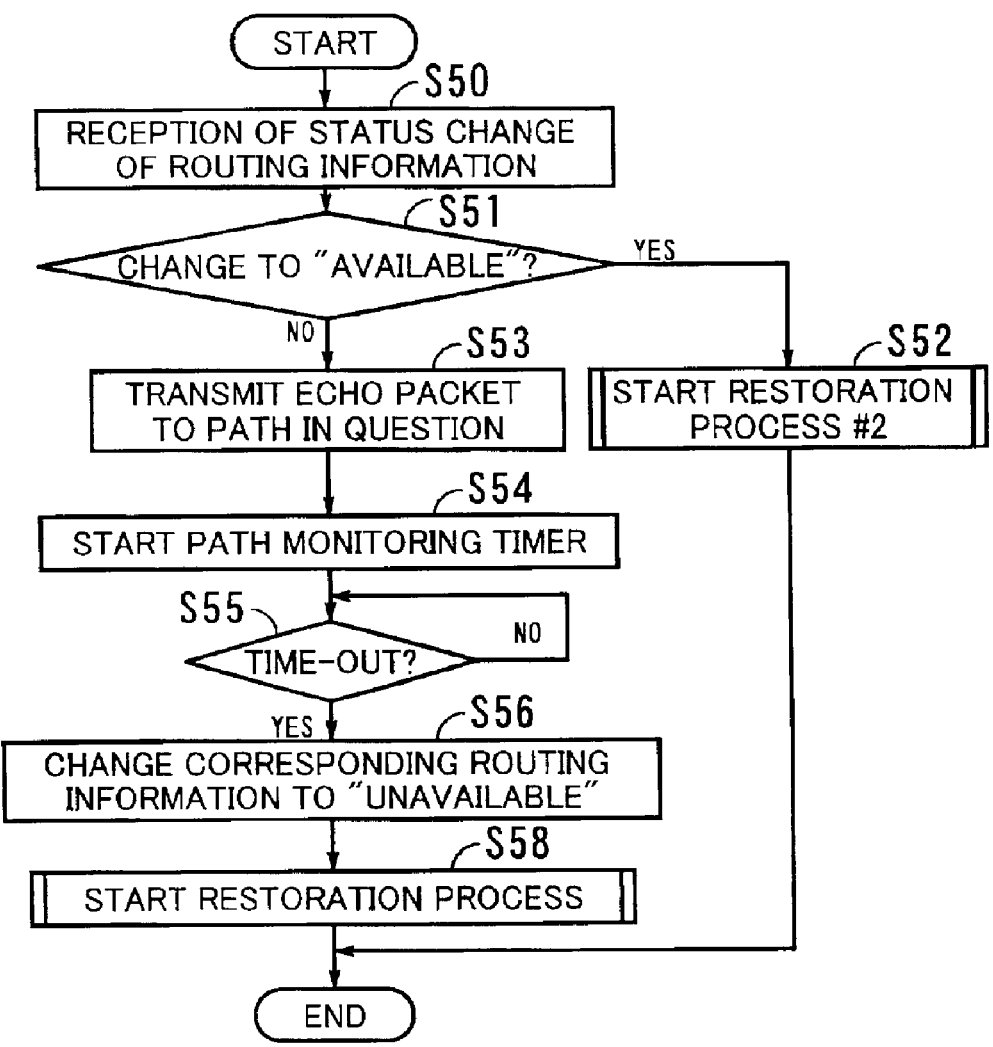
FIG. 12 is a flowchart showing an example of a process executed on receipt of information indicating a change of routing from another communication device.

Referring now to FIG. 12, an example of a process executed when a change of path status has been notified from the remote device will be described. Upon start of the process shown in the flowchart, the following steps are executed.

[S50] The UDP receiving/processing section 10c receives a change of the status of routing information.

[S51] If the path status has changed from "UNAVAILABLE" to "AVAILABLE", the flow proceeds to Step S52; if the change is from "AVAILABLE" to "UNAVAILABLE", the flow proceeds to Step S53.

[S52] A restoration process #2 for detecting restoration of the path by the echo process is started. Details of this process will be described later with reference to FIG. 13.

[S53] The IP packet transmitting/processing section 10h transmits an echo packet to the path in question.

[S54] The path monitoring/processing section 10e starts the path monitoring timer, not shown.

[S55] The path monitoring/processing section 10e determines whether or not a time-out has occurred. If a time-out has occurred, the flow proceeds to Step S56; otherwise the flow returns and Step S55 is repeated.

[S56] The path monitoring/processing section 10e changes the status of the corresponding routing information stored in the routing information management section 10d to "UNAVAILABLE".

[S57] The path monitoring/processing section 10e starts the restoration process shown in FIG. 11.

Figure 13:
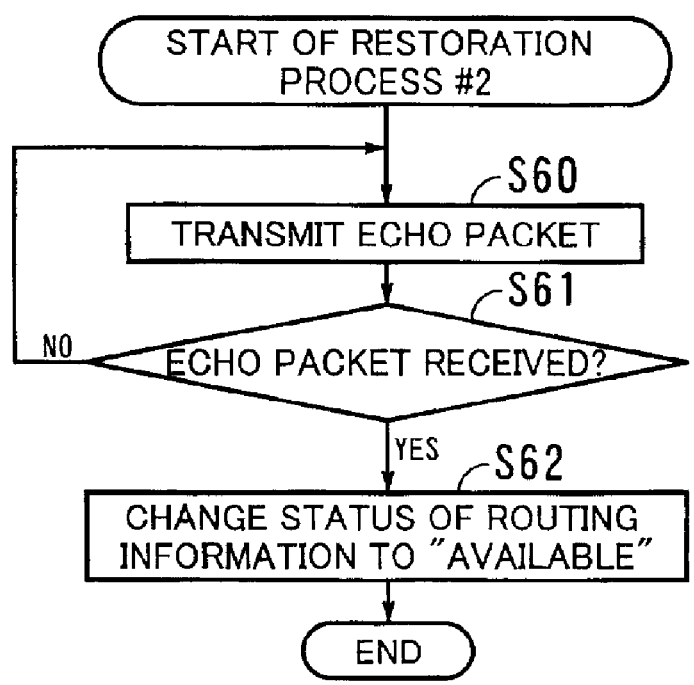
FIG. 13 is a flowchart illustrating details of a restoration process #2 appearing in FIG. 12.

Referring now to FIG. 13, the "RESTORATION PROCESS #2" appearing in FIG. 12 will be described in detail. Upon start of the process shown in the flowchart, the following steps are executed.

[S60] The IP packet transmitting/processing section 10h transmits an echo packet.

[S61] If the echo packet is not received by the IP packet receiving/processing section 10b, the flow returns to Step S60 and repeats the same process; if the echo packet has been received, the flow proceeds to Step S62.

[S62] The path monitoring/processing section 10e changes the status of the corresponding path stored in the routing information management section 10d to "AVAILABLE".

The processes described above make it possible to perform the functions already explained with reference to FIG. 3.

Although the above embodiment is described on the assumption that the number of paths is four, the configuration shown and described is given by way of example only and the present invention is of course not limited to such configuration alone.

Further, in the foregoing embodiment, only the routing information relevant to the communication device 11 is illustrated by way of example, but in practice similar routing information is prepared for each of remote communication devices.

Finally, the above-described processing functions can be performed by a computer. In this case, the contents of the functions to be accomplished by the communication device are described in a program recorded in a computer-readable recording medium. By executing the program by a computer, it is possible to perform the above-described processes. The computer-readable recording medium includes magnetic recording device, semiconductor memory and the like. To distribute the program to the market, the program may be stored in portable recording media such as CD-ROM (Compact Disk Read Only Memory) or floppy disk. Alternatively, the program may be stored in a storage device of a computer connected to a network and may be transferred to other computers through the network. To execute the program by a computer, the program stored in a hard disk unit or the like of the computer is loaded into the main memory and executed.

As described above, according to the present invention, a communication device for communicating with a remote device by using one of a plurality of paths comprises storing means for storing information relating to the paths, selecting means for selecting the information relating to one of the paths stored in the storing means, packet generating means for generating a packet with a header matching the information relating to the path selected by the selecting means, and transmitting means for transmitting the packet generated by the packet generating means, whereby an optimum path can be selected by looking up the conditions of the individual paths.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication device for communicating with a remote device by using one of a plurality of paths, comprising:

storing means for storing information relating to said plurality of paths, wherein said storing means additionally stores status information indicative of status of the individual paths in a manner associated with the respective paths;

selecting means for selecting the information relating to one of said plurality of paths stored in said storing means, wherein said selecting means selects the information relating to a path by looking up the status information;

packet generating means for generating a packet with a header matching the information relating to the path selected by said selecting means;

transmitting means for transmitting the packet generated by said packet generating means;

monitoring means for monitoring the status of the paths;

supply means for supplying said storing means with the status of the paths obtained by said monitoring means; and notifying means, responsive to detection of a change in the status of a path by said monitoring means, for notifying the remote device of the change of the status.

2. The communication device according to claim 1, wherein said selecting means selects, for a unit of connection, the information relating to one of said plurality of paths stored in said storing means.

3. The communication device according to claim 1, wherein the status of the paths indicates whether the individual paths are available or not.

4. The communication device according to claim 1, wherein the status of the paths indicates numbers of connections using the respective paths.

5. The communication device according to claim 1, further comprising receiving means for receiving a packet transmitted from the remote device; and updating means for looking up information included in the packet receiving by said receiving means and updating the information stored in said storing means.

6. A communication method for communicating with a remote device by using one of a plurality of paths, comprising the steps of:

storing information relating to said plurality of paths, wherein said stored information additionally stores status information indicative of status of the individual paths in a manner associated with the respective paths;

selecting the information relating to one of said plurality of paths stored in said storing step, wherein said selecting the information selects the information relating to a path by looking up the status information;

generating a packet with a header matching the information relating to the path selected is said selecting step;

transmitting the packet generated in said packet generating step;

monitoring the status of the paths;

supplying the stored information with the status of the paths obtained by the monitoring of the status of the paths; and notifying, responsive to detection of a change in the status of a path by said monitoring of the status of the paths, the remote device of the change of the status.

7. A computer-readable recording medium recording a program for causing a computer to perform a process of communicating with a remote device by using one of a plurality of paths, the program causing the computer to function as:

storing means for storing information relating to said plurality of paths, wherein said storing means additionally stores status information indicative of status of the individual paths in a manner associated with the respective paths;

selecting means for selecting the information relating to one of said plurality of paths stored in the storing means, wherein said selecting means selects the information relating to a path by looking up the status information;

packet generating means for generating a packet with a header matching the information relating to the path selected by the selecting means;

transmitting means for transmitting the packet generated by the packet generating means;

monitoring means for monitoring the status of the paths;

supply means for supplying said storing means with the status of the paths obtained by said monitoring means; and notifying means, responsive to detection of a change in the status of a path by said monitoring means, for notifying the remote device of the change of the status.

* * * * *